Patented Feb. 21, 1928.

1,660,264

UNITED STATES PATENT OFFICE.

EDWARD A. GARLOCK, OF BALTIMORE, MARYLAND.

METHOD OF MAKING STORAGE BATTERIES.

No Drawing. Application filed July 15, 1924. Serial No. 726,167.

This invention relates to storage batteries and particularly to a method of making storage batteries, the general object of the invention being to provide a method which will permit storage batteries to be made quickly at a very cheap price and without the necessity of using rollers, presses and the like relatively expensive and cumbersome apparatus for the purpose of forcing the paste into the interstices of the grid.

A further object is to provide a method such that the paste will swell and expand within the bars of the grid and thus through its expansion be forced into such intimate engagement with the bars or partitions of the grid that the paste will not flake and fall out.

A still further object is to provide a method of forming storage batteries which may be carried out in any ordinary shop without expensive appliance.

In forming a storage battery plate or element in accordance with my invention a grid of any desired form is taken and a paste applied thereto made up as follows: Lead oxide (PbO). This is made up into a paste with 1.080 or less sp. gr. sulphuric acid or even pure water may be used. This paste is plastered onto the grid between the bars thereof or into the interstices thereof with a wooden spatula. When the spaces between the bars of the grid have been entirely and completely filled with paste, the grid is placed in 1.180 sp. gr. sulphuric acid for twenty-four hours. It is then removed from the sulphuric acid and dried for from two to twenty-four hours. A number of grids are then burned to the battery posts in the usual manner. Separators, preferably of wood or cellular material, are then inserted between the plates, these separators preferably having the same form as the battery plates themselves and being slightly larger than the battery plates, and the plates are then inserted in the cell, together with 1.225 sp. gr. sulphuric acid, which completes the battery. It is then charged for from forty-eight to ninety hours and the cell is then tested.

The lead oxide which I use contains approximately one part of lead and one part of oxygen. The act of charging the battery causes an expansion of the paste made up and treated as I have described and this expansion forces the paste into all corners, crevices and joints of the grid. This expansion must take place in the plane of the grid itself for the reason that the separators lie flat against the opposite faces of the grid and hence the paste cannot expand in the direction of the separators. This is particularly aided by the fact that the separators, when the cell is filled with electrolyte, swell and expand and, therefore, fit tightly against the grids so that the only chance which the paste has to expand is in the plane of the grids and against the bars or partition walls of the grids so that the paste becomes thoroughly interlocked with the bars of the grid without the necessity of forcing the paste into intimate contact with the bars of the grid by means of presses, rollers and the like. I am not aware of the exact reason for the expansion of the paste under the action of the electric current, but I know that such an expansion takes place in actual practice. Furthermore, the expansion of the wood separators, as above remarked, is an additional means which causes the paste to be forced into intimate contact with the bars of the grid.

I claim:—

1. A method of forming storage batteries which consists in filling the bars of a plurality of grids with battery paste, hardening the paste, burning the grids to battery posts, inserting flat separators between the grids, inserting the grids within a cell together with an electrolyte, and then passing a charging current through the cell for from forty-eight to seventy hours, the charging current acting to electrically cause the expansion of the battery paste, the separators acting to prevent the expansion of the battery paste in any direction except in the planes of the grids.

2. A step in the method of forming battery plates which consists in filling the interstices of a grid with battery paste, hardening the paste and then immersing the grid in an electrolyte and passing current through the grid and electrolyte while preventing any expansion of the battery paste beyond the planes of the opposite faces of the grid to thereby cause the expansion of the paste in the plane of the grid and into intimate contact with the bars thereof.

3. A step in the method of making storage batteries which consists in filling the bars of a plurality of grids with a battery paste, hardening the paste by immersing the filled grids for twenty-four hours in relatively stronger sulphuric acid, drying the grids, burning the grids to battery posts, placing flat separators between the grids and disposing the grids within a cell containing electrolyte, said cell preventing lateral movement of the separators in a direction at right angles to the planes of the grids, then charging the battery for from forty-eight to seventy hours to thus electrically cause the expansion of the paste into intimate contact with the bars of the grid.

4. A method of making storage batteries consisting in covering a plurality of grids with a paste composed of one part of lead and one part of oxygen and 1.080 sp. gr. sulphuric acid, soaking the filled grids for approximately twenty-four hours in sulphuric acid at approximately 1.180 sp. gr. to thereby harden the grids, drying the hardened grids for from two to twenty-four hours, burning the grids to battery posts, disposing flat separators between the grids, and inserting the assembled grids within a battery cell containing 1.225 sp. gr. sulphuric acid and then charging for from forty-eight to seventy hours to thereby cause the battery plates to absorb oxygen and cause the formation of lead sulphate, thus causing the expansion of the paste within the bars of the grids.

In testimony whereof I hereunto affix my signature.

EDWARD A. GARLOCK.